United States Patent
Uchiyama et al.

(10) Patent No.: US 12,062,788 B2
(45) Date of Patent: Aug. 13, 2024

(54) NEGATIVE ELECTRODE ACTIVE MATERIAL FOR SECONDARY CELL, AND SECONDARY CELL

(71) Applicant: Panasonic Intellectual Property Management Co., Ltd., Osaka (JP)

(72) Inventors: Yohei Uchiyama, Hyogo (JP); Norihisa Yamamoto, Osaka (JP); Tatsuya Akira, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1058 days.

(21) Appl. No.: 16/963,611

(22) PCT Filed: Jan. 21, 2019

(86) PCT No.: PCT/JP2019/001719
§ 371 (c)(1),
(2) Date: Jul. 21, 2020

(87) PCT Pub. No.: WO2019/151026
PCT Pub. Date: Aug. 8, 2019

(65) Prior Publication Data
US 2021/0066716 A1    Mar. 4, 2021

(30) Foreign Application Priority Data
Jan. 30, 2018  (JP) .................. 2018-013997

(51) Int. Cl.
*H01M 4/58* (2010.01)
*H01M 4/13* (2010.01)
(Continued)

(52) U.S. Cl.
CPC ............. *H01M 4/58* (2013.01); *H01M 4/131* (2013.01); *H01M 4/134* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2008/0087869 A1* 4/2008 Ehrman ............... H01B 1/122
                                                     252/512
2017/0155150 A1* 6/2017 Barker ................. C01B 33/32
(Continued)

FOREIGN PATENT DOCUMENTS

JP   2011-233245 A   11/2011
WO   2016/121320 A1  8/2016
(Continued)

OTHER PUBLICATIONS

International Search Report dated Apr. 16, 2019, issued in counterpart International Application No. PCT/JP2019/001719 (2 pages).

*Primary Examiner* — Zhongqing Wei
(74) *Attorney, Agent, or Firm* — WHDA, LLP

(57) ABSTRACT

This negative electrode active material for a secondary cell which is one aspect of the present disclosure comprises: a silicate phase that contains Li, Si, and $M^x$ ($M^x$ alkali metal, alkaline earth metal, and an element other than Si); silicon particles dispersed in the silicate phase; and oxide particles that contain Zr dispersed in the silicate phase. The content of each element with respect to the total of the elements other than oxygen in the silicate phase is 3 to 45 mol % for Li, 40 to 78 mol % for Si, and 1 to 40 mol % for $M^x$.

10 Claims, 1 Drawing Sheet

(51) Int. Cl.
*H01M 4/131* (2010.01)
*H01M 4/134* (2010.01)
*H01M 10/0525* (2010.01)
*H01M 4/02* (2006.01)

(56) References Cited

U.S. PATENT DOCUMENTS

| | | |
|---|---|---|
| 2017/0214041 A1 | 7/2017 | Minami et al. |
| 2017/0309950 A1* | 10/2017 | Minami ................ H01M 4/405 |
| 2018/0287140 A1 | 10/2018 | Akira et al. |
| 2018/0287148 A1 | 10/2018 | Akira et al. |
| 2018/0342757 A1* | 11/2018 | Choi .................... H01M 4/525 |
| 2020/0020932 A1 | 1/2020 | Asano et al. |
| 2020/0035999 A1 | 1/2020 | Hayashida et al. |

FOREIGN PATENT DOCUMENTS

| | | |
|---|---|---|
| WO | 2016/121323 A1 | 8/2016 |
| WO | 2016/136180 A1 | 9/2016 |
| WO | 2017/051500 A1 | 3/2017 |
| WO | 2018/179969 A1 | 10/2018 |
| WO | 2018/179970 A1 | 10/2018 |

* cited by examiner

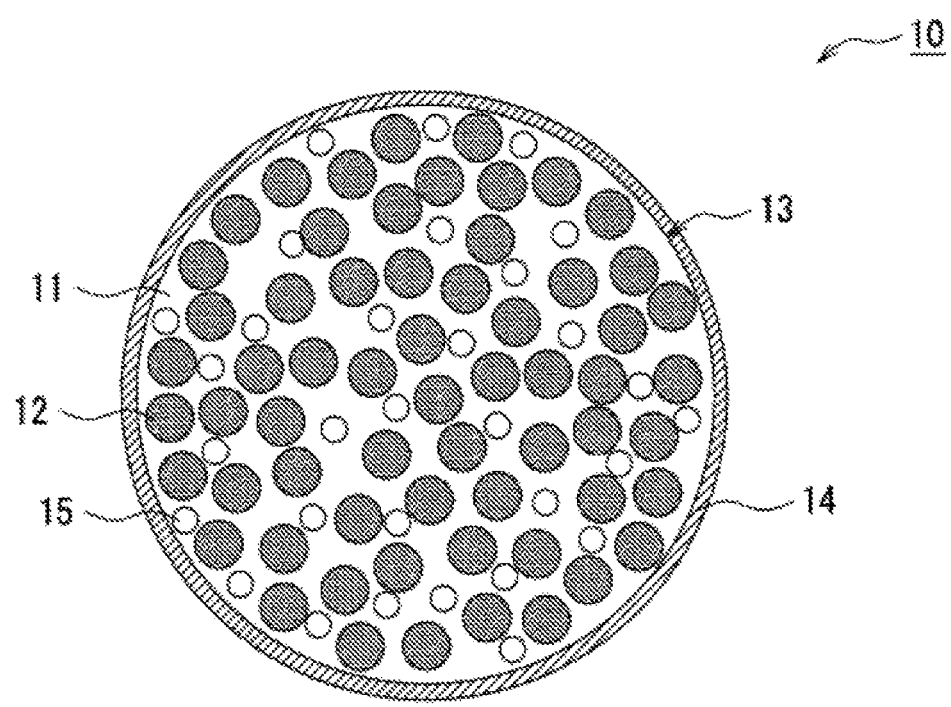

NEGATIVE ELECTRODE ACTIVE MATERIAL FOR SECONDARY CELL, AND SECONDARY CELL

TECHNICAL FIELD

The present disclosure relates to a negative electrode active material for a secondary battery, and a secondary battery.

BACKGROUND ART

It is known that silicon materials such as silicon (Si) and silicon oxide represented by $SiO_x$ can intercalate more ions such as lithium ions per unit volume than carbon materials such as graphite.

For example, Patent Literature 1 discloses a non-aqueous electrolyte secondary battery in which a mixture of $SiO_x$ and graphite is used as a negative electrode active material.

CITATION LIST

Patent Literature

PATENT LITERATURE 1: Japanese Unexamined Patent Application Publication No. 2011-233245

SUMMARY

It is desired that charge/discharge cyclic characteristics be improved in secondary batteries in which silicon particles are used as a negative electrode active material.

Thus, an object of the present disclosure is to provide a negative electrode active material for a secondary battery that can prevent deterioration in the charge/discharge cyclic characteristics of secondary batteries in which silicon particles are used as a negative electrode active material, and a secondary battery.

A negative electrode active material for a secondary battery according to one aspect of the present disclosure comprises a silicate phase including Li, Si, and $M^x$, wherein $M^x$ is an element other than an alkali metal, an alkaline earth metal, or Si; silicon particles dispersed in the silicate phase; and oxide particles including at least any one of oxide particles including Zr, oxide particles including Ce, oxide particles including Ca, oxide particles including Al, oxide particles including Fe, oxide particles including Mg, oxide particles including Ti, and oxide particles including W, dispersed in the silicate phase, wherein, in the silicate phase, a Li content is 3 to 45 mol %, a Si content is 40 to 78 mol %, and an $M^x$ content is 1 to 40 mol %, each based on the total amount of elements other than oxygen. When the silicate phase further includes an alkaline earth metal M, the M content is 1 to 10 mol %.

A secondary battery as an aspect of the present disclosure comprises: a negative electrode having the negative electrode active material for a secondary battery described above, a positive electrode, and an electrolyte.

Advantageous Effect of Invention

According to one aspect of the present disclosure, deterioration in the charge/discharge cyclic characteristics can be prevented in secondary batteries in which silicon particles are used as a negative electrode active material.

BRIEF DESCRIPTION OF DRAWING

FIG. 1 is a sectional view schematically illustrating a particle of the negative electrode active material as an exemplary embodiment.

DESCRIPTION OF EMBODIMENTS

For example, when silicon particles are used as a negative electrode active material for a lithium ion secondary battery, the following reactions occur upon charge/discharge of the secondary battery, for example.

Charge: 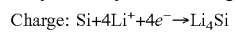

Discharge: 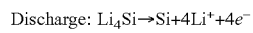

Usually, silicon particles have a large volume change due to the above charge/discharge reaction. Thus, when charge/discharge cycles are repeated, the particle structure is broken, resulting in the deterioration in the charge/discharge cyclic characteristics of the battery. The present inventors have thus been intensively conducting studies to find that dispersion of silicon particles and predetermined metal oxide particles in a silicate phase having a predetermined component can prevent a volume change of the silicon particles due to the charge/discharge reaction, to thereby prevent the breakage of the particle structure, thus conceiving a negative electrode active material of aspects described below.

A negative electrode active material for a secondary battery according to one aspect of the present disclosure comprises a silicate phase including Li, Si, and $M^x$, wherein $M^x$ is an element other than an alkali metal, an alkaline earth metal, or Si; silicon particles dispersed in the silicate phase; and oxide particles including at least any one of oxide particles including Zr, oxide particles including Ce, oxide particles including Ca, oxide particles including Al, oxide particles including Fe, oxide particles including Mg, oxide particles including Ti, and oxide particles including W, dispersed in the silicate phase, wherein, in the silicate phase, a Li content is 3 to 45 mol %, a Si content is 40 to 78 mol %, and an $M^x$ content is 1 to 40 mol %, each based on the total amount of elements other than oxygen. When the silicate phase further includes an alkaline earth metal M, the M content is 1 to 10 mol %. It can be considered that the silicate phase having the predetermined components described above has a hardness sufficient to prevent the volume change of the silicon particles due to the charge/discharge reaction, and it can be considered that further dispersion of the oxide particles described above in the silicate phase allows the oxide particles to function as a filler that reinforces the silicate phase to thereby further enhance the hardness of the silicate phase. Then, dispersion of silicon particles in the silicate phase reinforced by the oxide particles described above reduces the volume change of the silicon particles due to the charge/discharge reaction. It is thus considered that the breakage of the particle structure due to the charge/discharge cycles is prevented, and consequently, the deterioration in the charge/discharge cyclic characteristics of the battery is prevented. The silicate phase having the predetermined components described above exhibits a good ion conductivity for ions such as lithium ions. It is thus considered that, upon charge/discharge, ions such as lithium ions migrate relatively smoothly in the silicate phase to efficiently react with the silicon particles dispersed in the silicate phase.

The negative electrode active material for a secondary battery according to one aspect of the present disclosure is suitably used as a negative electrode active material for a lithium ion secondary battery, for example. Hereinafter, the negative electrode active material for a secondary battery according to one aspect of the present disclosure will be described with a lithium ion secondary battery taken as an example. The drawing referred to for the description of embodiments below is schematically illustrated, and the dimensions, the proportions, and the like of the components illustrated in the drawing may be different from those of actual products. Specific dimensions, proportions, and the like should be determined in consideration of the description below.

A lithium ion secondary battery as an exemplary embodiment comprises a negative electrode, a positive electrode, and an electrolyte. A separator is preferably disposed between the positive electrode and the negative electrode. In an exemplary structure of the lithium ion secondary battery, an exterior body houses an electrode assembly formed by winding the positive electrode and the negative electrode together with the separator therebetween, and the electrolyte, the electrode assembly is not limited to an electrode assembly having the wound structure, and all electrode assembly of another type may be applied, including an electrode assembly having a laminated structure formed by alternately laminating positive electrodes and negative electrodes with separators therebetween. The lithium ion secondary battery may be any form including a cylindrical shape, a rectangular shape, a coin shape, a button shape, and a laminated shape.

Positive Electrode

The positive electrode preferably includes a positive electrode current collector, such as a metal foil, and a positive electrode mixture layer formed on the current collector. Foil of a metal that is stable in the electric potential range of the positive electrode, such as aluminum, a film with such a metal disposed as an outer layer, and the like can be used for the positive electrode current collector. The positive electrode mixture layer preferably includes a positive electrode active material and additionally includes a conductive agent and a binder. The surface of the particle of the positive electrode active material may be coated with micro particles of an oxide such as aluminum oxide ($Al_2O_3$) or an inorganic compound such as a phosphoric acid compound or a boric acid compound.

Examples of the positive electrode active material include a lithium transition metal oxide, which contains a transition metal element such as Co, Mn, or Ni. Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M; at least one of the group consisting of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly, or two or more thereof may be mixed and used.

Examples of the conductive agent include carbon materials such as carbon black, acetylene black, Ketjen black, and graphite. These may be used singly or in combinations of two or more thereof.

Examples of the binder include fluoro resins, such as polytetrafluoroethylene (PTFE) and poly(vinylidene fluoride) (PVdF), polyacrylonitrile (PAN), polyimide resins, acrylic resins, and polyolefin resins. These resins may be combined with carboxymethyl cellulose (CMC) or a salt thereof (e.g., CMC-Na, CMC-K, or CMC—$NH_4$ which may be a partially neutralized salt), poly(ethylene oxide) (PEO), or the like. These may be used singly or in combinations of two or more thereof.

Negative Electrode

The negative electrode preferably includes a negative electrode current collector, such as a metal foil, and a negative electrode mixture layer formed on the current collector. Foil of a metal that is stable in the electric potential range of the negative electrode, such as copper, a film with such a metal disposed as an outer layer, and the like can be used for the negative electrode current collector. The negative electrode mixture layer preferably includes a negative electrode active material (negative electrode active material particles to be explained below) and additionally includes a binder. As the binder, fluoro resins, PAN, polyimide resins, acrylic resins, polyolefin resins, and the like can be used, as in the positive electrode. When a mixture slurry is prepared using an aqueous solvent, CMC or a salt thereof (e.g., CMC-Na, CMC-K, or CMC—$NH_4$ which may be a partially neutralized salt), styrene-butadiene rubber (SBR), poly(acrylic acid) (PAA) or a salt thereof (e.g., PAA-Na or PAA-K which may be a partially neutralized salt), poly(vinyl alcohol) (PVA), or the like is preferably used.

FIG. 1 shows a sectional view of a particle of the negative electrode active material as an exemplary embodiment. A particle 10 of the negative electrode active material shown in FIG. 1, which is a negative electrode active material contained in a negative electrode mixture layer, comprises a base particle 13 having a silicate phase 11, silicon particles 12 dispersed in the silicate phase 11, and oxide particles 15 dispersed in the silicate phase 11. The base particle 13 has a sea/island structure in which fine silicon particles 12 and oxide particles 15 are dispersed in the silicate matrix, for example. The particle 10 of the negative electrode active material, as shown in FIG. 1, preferably has a conductive layer 14 formed on the surface of the base particle 13.

The silicon particles 12 can intercalate more lithium ions than carbon materials such as graphite, and thus a larger capacity battery is achieved. On the surface of the silicon particles 12, $SiO_2$ as a natural oxidized film may be formed. Increase in the amount of $SiO_2$ as a natural oxidized film may lead to deterioration in the battery capacity, charge/discharge cyclic characteristics, or the like. Thus, the content of $SiO_2$ as the natural oxidized film is preferably less than 10 mass % and more preferably less than 7 mass % based on the total mass of the base particle 13.

The content of the silicon particles 12 is preferably 20 mass % to 95 mass % and more preferably 35 mass % to 75 mass % based on the total mass of the base particle 13 (the total mass of the silicate phase 11, the silicon particles 12, and the oxide particles 15) in view of a larger capacity, improvement in the charge/discharge cyclic characteristics, and the like. If the content of the silicon particles 12 is too low, the charge/discharge capacity decreases, for example, and also diffusion of lithium ions may be poor, resulting in deterioration of loading characteristics. If the content of the silicon particles 12 is too high, the effect of preventing deterioration in the charge/discharge cyclic characteristics may be reduced, for example.

The average particle size of the silicon particles 12 is, for example, 500 nm or less, preferably 200 nm or less, and more preferably 50 nm or less before the first charge. The average particle size is preferably 400 nm or less and more preferably 100 nm or less after charge/discharge. Fine silicon particles 12 exhibit reduced volume change thereof upon charge/discharge and are thus likely to prevent the breakage of the electrode structure. The average particle size of the silicon particles 12 is determined through observation of the cross section of the particles 10 of the negative electrode active material using a scanning electron microscope (SEM) or a transmission electron microscope (TEM), and specifically, is obtained by averaging the longest particle diameters of one hundred silicon particles 12.

The oxide particles 15 include at least any one of oxide particles including Zr, oxide particles including Ce, oxide particles including Ca, oxide particles including Al, oxide particles including Fe, oxide particles including Mg, oxide particles including Ti, and oxide particles including W. It is considered that dispersion of the oxide particles 15 in the silicate phase 11 enhances the hardness of the silicate phase 11, reduces the volume change of the silicon particles 12, and the like, to thereby prevent deterioration in the charge/discharge cyclic characteristics. The oxide particles 15 preferably include oxide particles including Zr, among oxide particles described above, in view of enhancing the hardness of the silicate phase 11, further preventing the deterioration in the charge/discharge cyclic characteristics, and the like. The content of oxide particles including Zr is preferably 50 mass % or more, more preferably 60 mass % or more, and particularly preferably 70 mass % or more based on the total mass of the oxide particles 15. When the oxide particles 15 include oxide particles including Zr, the oxide particles including Zr preferably include a Y element, and examples thereof include composite oxide particles being a solid solution of an oxide including Zr such as $ZrO_2$ and an oxide including Y such as $Y_2O_3$. The oxide particles 15 preferably include oxide particles including a Y element in addition to the oxide particles including Zr, and examples thereof include mixed oxide particles of oxide particles including Z such as $ZrO_2$ (which may include a Y element and the like) and oxide particles including Y such as $Y_2O_3$.

The oxide particles 15 are only required to include at least any one of oxide particles including Zr, oxide particles including Ce, oxide particles including Ca, oxide particles including Al, oxide particles including Fe, oxide particles including Mg, oxide particles including Ti, and oxide particles including W, and preferably include one or more types of oxide particles selected from $ZrO_2$, $CeO_2$, $CaO$, $Al_2O_3$, $Fe_2O_3$, $Fe_2O_4$, $FeO$, $MgO$, $TiO_2$, and $WO_3$, for example, in view of enhancing the hardness of the silicate phase 11, further preventing the deterioration in the charge/discharge cyclic characteristics, and the like.

The content of the oxide particles 15 is preferably 0.02 mass % to 20 mass % and more preferably 3 mass % to 15 mass % based on the total mass of the base particle 13 (the total mass of the silicate phase 11, the silicon particles 12, and the oxide particles 15) in view of preventing the deterioration in the charge/discharge cyclic characteristics and the like.

The average particle size of the oxide particles 15 is preferably 10 μm or less and more preferably in the range of 0.1 to 1 μm. As long as the particle size of the oxide particles 15 is within the range, a uniform dispersion state of the oxide particles 15 in the silicate phase 11 is likely to be formed, and it is possible to further enhance the hardness of the silicate phase 11. The average particle size of the oxide particles 15 is measured through observation of the cross section of the particles 10 of the negative electrode active material using a SEM or TEM, as in the case of the silicon particles 12, and specifically is determined by averaging the longest particle diameters of one hundred oxide particles 15.

The silicate phase 11 includes Li, Si, and $M^x$, wherein $M^x$ is an element other than an alkali metal, an alkaline earth metal or Si. In the silicate phase 11, the Li content is 3 to 45 mol %, the Si content is 40 to 78 mol %, and $M^x$ is 1 to 40 mol %, each based on the total amount of elements other than oxygen. When the silicate phase 11 further includes an alkaline earth metal M, the M content is 1 to 10 mol %. M is an element for an optional component MO, which may be included in the silicate phase 11, and M is an alkaline earth metal. Thus, it is considered that the silicate phase 11, having the specific components in the predetermined amount, as stated hereinabove, has a hardness sufficient to prevent the volume change of the silicon particles 12 and also has a high ion conductivity. $M^x$ is any one of $M^1$, $M^2$, $M^3$, and $M^4$, and $M^1$, $M^2$, $M^3$, and $M^4$ are elements for $M^1_2O_3$, $M^2O_2$, $M^3_2O_5$, and $M^4O$, respectively. Thus, it can be considered that the silicate phase 11 has a structure in which $Li_2O$, $SiO_2$, and oxides including $M^1O_2$, $M^2_2O_3$, $M^3_2O_5$, and $M^4O_3$ (and MO mentioned below) are bonded to each other.

In view of, for example, securely preventing the deterioration in the charge/discharge cyclic characteristics, in the silicate phase 11, the Li content is preferably 5 to 23 mol %, the Si content is preferably 45 to 78 mol %, and the content of $M^1$, $M^2$, $M^3$, and $M^4$ is preferably 2 to 35 mol %, each based on the total amount of elements other than oxygen.

It is preferable that the silicate phase 11 include $M^1$ as a result of, for example, adding $M^1O_2$ and sintering the resultant to produce the silicate phase 11. Specifically, it is preferable that the silicate phase 11 include any one element of Zr, Ge, and Ti as a result of adding as $M^1O_2$ at least any one of $ZrO_2$, $GeO_2$, and $TiO_2$ and sintering the resultant. Through sintering the oxide, the hardness or the ion conductivity of the silicate phase 11 may increase to thereby securely prevent the deterioration in the charge/discharge cyclic characteristics or obtain a larger capacity battery.

It is preferable that the silicate phase 11 include $M^2$ as a result of, for example, adding $M^2_2O_3$ and sintering the resultant to produce the silicate phase 11. Specifically, it is preferable that the silicate phase 11 include any one element of Al, B, Bi, Y, La, and Sb as a result of adding as $M^2_2O_3$ at least any one of $Al_2O_3$, $B_2O_3$, $Bi_2O_3$, $Y_2O_3$, $La_2O_3$, and $Sb_2O_3$ and sintering the resultant. Through sintering the oxide, the hardness or the ion conductivity of the silicate phase 11 may increase to thereby securely prevent deterioration in the charge/discharge cyclic characteristics or obtain a larger capacity battery.

It is preferable that the silicate phase 11 include $M^3$ as a result of, for example, adding $M^3_2O_5$ and sintering the resultant to produce the silicate phase 11. Specifically, it is preferable that the silicate phase 11 include any one element of Nb, La, Ta, P, and V as a result of adding as $M^3_2O_5$ at least any one of $Nb_2O_5$, $La_2O_5$, $Ta_2O_5$, $P_2O_5$, and $V_2O_5$ and sintering the resultant. Through sintering the oxide, the hardness or the ion conductivity of the silicate phase 11 may increase to thereby securely prevent deterioration in the charge/discharge cyclic characteristics or obtain a larger capacity battery.

It is preferable that the silicate phase 11 include $M^4$ as a result of, for example, adding $M^4O_3$ and sintering the resultant to produce the silicate phase 11. Specifically, it is preferable that the silicate phase 11 include W as a result of adding $WO_3$ as $M^4O_3$ and sintering the resultant. Through sintering the oxide, the hardness or the ion conductivity of the silicate phase 11 may increase to thereby securely prevent deterioration in the charge/discharge cyclic characteristics or obtain a larger capacity battery.

The silicate phase 11 may include an alkaline earth metal M as a result of, for example, adding MO (alkaline earth metal) and sintering the resultant. When the silicate phase 11 includes M, the M content in the silicate phase 11 is 1 to 10 mol % and preferably 1 to 5 mol % based on the total amount of elements other than oxygen. If the M content in the silicate phase 11 is more than 10 mol %, the ion conductivity may decrease to thereby fail to sufficiently prevent the deterioration in the charge/discharge cyclic characteristics.

When the silicate phase 11 includes an alkaline earth metal M, M includes at least any one of Be, Mg, Ca, Sr, Ba, Ra, Pb, and Cu. In this case, the silicate phase 11 can be produced through, for example, adding as MO at least any one of BeO, MgO, CaO, SrO, BaO, RaO, PbO, and CuO and sintering the resultant. When the content of the oxide is less than the given value, the hardness or the ion conductivity of the silicate phase 11 may increase to thereby securely prevent deterioration in the charge/discharge cyclic characteristics or obtain a larger capacity battery.

The content of each element included in the silicate phase 11 can be determined in the following manner, for example.

First, a sample of the silicate phase 11 is thoroughly dissolved in a hot acid solution (mixed acid of hydrofluoric acid, nitric acid, and sulfuric acid), and carbon that is the insoluble residue is removed by filtration. The filtrate obtained is analyzed by inductively coupled plasma atomic emission spectroscopy (ICP-AES) to determine the spectral intensity of each metal element. A calibration curve is prepared using commercially available standard solutions of metal elements, and the content of each metal element included in the silicate phase 11 is calculated on the calibration curve. The contents of silicon and boron are determined in the same manner as above, except that the sample is melted with sodium carbonate followed by filtration.

The content of each metal oxide in the silicate phase 11 can be estimated, for example, from the content of each metal element determined as above. For example, when the metal element is Al, the amount of $Al_2O_3$ calculated on the supposition that all Al forms $Al_2O_3$ is taken as the amount of the Al oxide assumed. When the metal element is Ca, the amount of CaO calculated on the supposition that all Ca forms CaO is taken as the amount of the Ca oxide assumed.

The content of the sodium silicate phase 11 is preferably 5 mass % to 80 mass % and more preferably 25 mass % to 65 mass % based on the total mass of the base particle 13 (the total mass of the silicate phase 11, the silicon particles 12, and the oxide particles 15) in view of the improvement in the charge/discharge cyclic characteristics and the like.

The average particle size of the particles 10 of the negative electrode active material is preferably 1 to 15 μm, and more preferably 4 to 10 μm in view of, for example, larger capacity and improvement in the cyclic characteristics. The average particle size of the particles 10 of the negative electrode active material herein means a diameter (a volume average particle size) at an integrated volume of 50% in the particle size distribution analyzed according to the laser diffraction/scattering method (using, for example, "LA-750" manufactured by HORIBA, Ltd.). If the average particle size of the particles 10 of the negative electrode active material is too small, the surface area thereof is larger, and therefore the amount thereof reacting with an electrode is likely to be larger, resulting in decrease in capacity. On the other hand, if the average particle size of the particles 10 of the negative electrode active material is too large, the change in the volume due to charge/discharge may be larger, sometimes resulting in reduction in the effect of preventing decrease in the charge/discharge cyclic characteristics. It is preferable to form a conductive layer 14 on the surface of the particles 10 (base particle 13) of the negative electrode active material. However, the thickness of the conductive layer 14 is so small that it has substantially no influence on the average particle size of the particles 10 of the negative electrode active material (the particle size of the particle 10 of the negative electrode active material≈the particle size of the base particle 13).

The particles 10 of the negative electrode active material may be used alone as a negative electrode active material for the negative electrode mixture layer, or may be combined with another active material. For example, a carbon material such as graphite is preferable as the other active material. When a carbon material is combined therewith, the mass ratio of the particles 10 of the negative electrode active material and the carbon material is preferably 1:99 to 30:70 in view of, for example, a larger capacity and improvement in the charge/discharge cyclic characteristics.

The base particles 13 are produced through, for example, the following steps 1 to 4. The following steps are each preferably conducted in an inert atmosphere, although step 1 can be conducted in atmospheric air.

(1) Predetermined amounts of a Li material, a Si material, a material including at least any one of an $M^1$ material, an $M^2$ material, an $M^3$ material and an $M^4$ material, and an M material, are mixed, and the mixture is heated and melted. The melt is made into flakes through metal rolls to produce silicate. Then, the silicate flakes are heat-treated for crystallization in atmospheric air at a temperature of the glass transition point or more and the melting point or less. Alternately, the silicate flakes may be used without undergoing crystallization. The mixture obtained by mixing the predetermined amounts of the materials may be fired at a temperature equal to or less than the crystal melting point without undergoing melting, to thereby produce silicate through a solid-phase reaction. Examples of the Li material include lithium oxide, lithium carbonate, and lithium hydroxide. Examples of the Si material include silicon oxide. Examples of the $M^1$ material, the $M^2$ material, the $M^3$ material, and the $M^4$ material include an oxide, a hydroxide, and a carbonate compound of an element other than an alkali metal, an alkaline earth metal, or Si. Examples of the M material include an oxide, a hydroxide, and a carbonate compound of an alkaline earth metal. It is preferable to avoid contamination with an alkali metal other than lithium as much as possible, because the existence of an alkali metal other than lithium, such as sodium and potassium, in the silicate decreases the ion conductivity. However, when the silicate is contaminated with any alkali metal other than lithium as an inevitable impurity, the content thereof is preferably less than 3 mol %.

(2) A silicate powder obtained by grinding the silicate described above to an average particle size of approximately several micrometers to several tens of micrometers, a Si powder having an average particle size of approximately several micrometers to several tens of micrometers, and the oxide particles mentioned above are mixed in a predetermined mass ratio to produce a mixture.

(3) Then, the mixture is ground for atomization in a ball mill. Alternatively, the material powders may each be atomized and then mixed to produce a mixture. The time duration for the grinding treatment is desirably a duration such that the crystallite size of the ground powder becomes 25 nm or less, the crystallite size of the ground powder being calculated by Scherrer equation from the half width of the diffraction peak of the Si (111) plane in the XRD pattern obtained by XRD measurement on the ground powder. The specific conditions and the like for the measurement of the crystallite size are as follows.

Measurement system: In-plane multipurpose X-ray diffraction system Ultima IV (manufactured by Rigaku Corporation)

Analytical software: one-stop full-function powder X-ray diffraction analysis software PDXL (manufactured by Rigaku Corporation)

Measurement conditions: 20 to 90°, using a diffraction peak of Si (111) plane (2=28 to 29°), 5000 counts or more at the top of the peak Anticathode: Cu—Kα
Tube current/voltage: 40 mA/40 kV
Counting time: 1.0 s
Divergence slit: ⅔°
Vertical divergence limiting slit: 10 mm
Scattering slit: ⅔°
Light receiving slit: 0.3 mm
Sample spinning: 60 rpm (4) The ground mixture is heat-treated at, for example, 600 to 1000° C. In this heat treatment, pressure may be applied to the mixture, as in hot press, to produce a sintered compact of the mixture. The Si powder and the silicate powder may be mixed and heat-treated without using a ball mill to produce base particles 13.

The silicate produced in step (1) is for forming the silicate phase 11 described above and has high hardness. Thus, the silicate powder having a high hardness is brought into contact with the Si powder in step (3), and the Si powder is therefore easily atomized. Thus, the time required for reaching the prescribed atomization level can be shortened.

The conductive material for forming the conductive layer 14 is preferably electrochemically stable, and is preferably at least one selected from the group consisting of a carbon material, a metal, and a metal compound. As the carbon material, carbon black, acetylene black, Ketjen black, graphite, and a mixture of two or more thereof can be used, as in the conductive material for the positive electrode mixture layer. As the metal, copper, nickel, and an alloy thereof that is stable in the electric potential range of the negative electrode can be used. Examples of the metal compounds include a copper compound and a nickel compound (a metal or metal compound layer can be formed on the surface of the base particle 13 by, for example, nonelectrolytic plating). Among these, the carbon material is particularly preferably used.

Examples of the method for coating the surface of the base particle 13 with the carbon material include a CVD method involving using acetylene, methane, or the like, and a method in which the base particles 13 are mixed and heat-treated with coal pitch, petroleum pitch, a phenol resin, or the like. Alternatively, carbon black, Ketjen black, or the like may be adhered to the surface of the base particles 13 with a binder.

Preferably, almost the whole area of the surface of the base particle 13 is covered with the conductive layer 14. The thickness of the conductive layer 14 is preferably 1 to 200 nm and more preferably 5 to 100 nm in view of ensuring the conductivity and the diffusibility of lithium ions into the base particles 13. If the thickness of the conductive layer 14 is too small, the conductivity decreases, and it is also difficult to uniformly cover the base particles 13. On the other hand, if the thickness of the conductive layer 14 is too large, there is a tendency for the diffusion of the lithium ions into the base particles 13 to be inhibited, which decreases the capacity. The thickness of the conductive layer 14 can be measured through observation of the cross section of the particle using SEM, TEM, or the like.

Electrolyte

The electrolyte includes a solvent and an electrolyte salt dissolved in the solvent. The electrolyte is not limited to a liquid electrolyte and may be a solid electrolyte using a gel polymer or the like. As the solvent, it is possible to use a non-aqueous solvent comprising, for example, esters, ethers, nitriles such as acetonitrile, amides such as dimethylformamide, and mixed solvents of two or more thereof or an aqueous solvent. The non-aqueous solvent may contain a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone (GBL) and γ-valerolactone (GVL); and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product preferable for use include a fluorinated cyclic carbonate ester such as fluoroethylene carbonate (FEC), a fluorinated chain carbonate ester, and a fluorinated chain carboxylate ester such as methyl fluoropropionate (FMP).

As the electrolyte salt, a lithium salt or the like is used. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LiN(SO_2CF_3)_2$, $LiN(C_lF_{2l+1}SO_2)(C_mF_{2m+1}SO_2)$ (wherein l and m are integers of 0 or more). These lithium salts may be used singly, or two or more thereof may be mixed and used. Among these, $LiPF_6$ is preferably used in view of ionic conductivity, electrochemical stability, and other properties. The concentration of the lithium salt is preferably 0.8 to 1.8 mol per 1 L of the non-aqueous solvent.

Separator

An ion-permeable and insulating porous sheet is used as the separator. Specific examples of the porous sheet include a microporous thin film, woven fabric, and nonwoven fabric. Suitable examples of the material for the separator include olefin resins such as polyethylene and polypropylene, and cellulose. The separator may be a laminate including a cellulose fiber layer and a layer of fibers of a thermoplastic resin such as an olefin resin.

EXAMPLES

Hereinafter, the present disclosure will be described in more detail by way of Examples, but the present disclosure is not limited thereby.

Example 1

Production of Negative Electrode Active Material

Lithium oxide, silicon dioxide, calcium oxide, boron oxide, and aluminum oxide were mixed in a molar ratio of $Li_2O/SiO_2/CaO/B_2O_3/Al_2O_3=22/72/1/2/3$. The resulting mixture was melted in an inert atmosphere at 1500° C. for 5 hours, and the melt was passed through metal rollers to obtain flakes. The flakes were heat-treated for crystallization at 750° C. for 5 hours to produce silicate including Li, Si, Ca, B, and Al.

The silicate was ground to an average particle size of 10 μm to obtain a silicate powder. In an inert atmosphere, a Si powder (3N, 10 μm ground product) and the silicate powder were weighed in a mass ratio of 42:58, $ZrO_2$ oxide particles were added thereto such that the content thereof reached 0.1 mass %, and the mixture was placed in a pot (made of SUS, volume: 500 mL) of a planetary ball mill (P-5, manufactured by FRITSCH). Twenty four SUS balls (diameter: 20 mm) were placed in the pot, and a lid was put thereon, followed by grinding treatment at 200 rpm for 25 hours. Then, the resulting powder was taken out in an inert atmosphere, and heat-treated in conditions of a temperature of 600° C. for 4 hours in an inert atmosphere. The heat-treated powder (hereinafter, referred to as base particles) was ground and passed through a 40-μm mesh, and the resulting powder was mixed with coal pitch (MCP 250, manufactured by JFE Chemical Corporation). The mixture was heat-treated in conditions of a temperature of 800° C. for 5 hours in an inert atmosphere to coat the surface of each base particle with carbon, thereby forming a conductive layer. The amount of the carbon coating was 5 mass % based on the total mass of the particle composed of the base particle and the conductive layer. The resultant was then conditioned using an Elbow-Jet classifier so as to have an average particle size of 5 μm, thereby obtaining a negative electrode active material.

Analysis of Negative Electrode Active Material

As a result of observation with a SEM on the cross sections of the particles of the negative electrode active material, the average particle size of the Si particles dispersed in the silicate phase was less than 100 nm, and the average particle size of the $ZrO_2$ oxide particles dispersed in the silicate phase was 1 μm. The content of each element in the silicate phase was calculated through ICP emission spectral analysis. It is necessary for Si particles to be distinguished from the Si element in the silicate phase, and so the content of Si element in the silicate phase is calculated so as not to include Si particles. Specifically, it was calculated in the following manner. First, the amount of Si included in the whole of the negative electrode active material was determined through ICP emission spectral analysis. Then, Si particles dispersed in the lithium silicate phase were heated for crystallization in a vacuumed atmosphere at 930° C. for 10 hours, and the resulting powder was subjected to XRD analysis. The Si content was calculated from the integrated value of Si peaks in the XRD analysis. From the measurement results, the amount of Si element in the lithium silicate phase was determined by arithmetic operation. The contents of Li, Si, Ca, B, and Al elements in the silicate phase were 34.6 mol %, 56.7 mol %, 0.8 mol %, 3.1 mol %, and 4.7 mol % respectively.

Preparation of Negative Electrode

Next, the above-described negative electrode active material and polyacrylonitrile (PAN) were mixed in a mass ratio of 95:5, and N-methyl-2-pyrrolidone (NMP) was added thereto. The resulting mixture was then stirred using a mixer (THINKY MIXER Awatori-Reutaroh, manufactured by THINKY CORPORATION) to prepare a negative electrode mixture slurry. Then, the slurry was applied to one side of a copper foil so that the mass of the negative electrode mixture layer was 25 g per $m^2$. The coating was dried at 105° C. in atmospheric air, and then rolled to produce a negative electrode. The packing density of the negative electrode mixture layer was 1.50 $g/cm^3$.

Preparation of Non-Aqueous Electrolyte Solution

Ethylene carbonate (EC) and diethyl carbonate (DEC) were mixed in a volume ratio of 3:7. $LiPF_6$ was added to the mixed solvent to a concentration of 1.0 mol/L to thereby prepare a non-aqueous electrolyte solution.

Production of Non-Aqueous Electrolyte Secondary Battery

In an inert atmosphere, the negative electrode described above and a lithium metal foil, each having a Ni tab attached thereto, were disposed opposite to each other with a polyethylene separator interposed therebetween to thereby form an electrode assembly. The electrode assembly was then housed in a battery exterior body made of an aluminum-laminated film, and the non-aqueous electrolyte solution was injected to the battery exterior body. The battery exterior body was sealed to thereby prepare a non-aqueous electrolyte secondary battery.

Example 2

A negative electrode active material was produced in the same manner as in Example 1, except that, in an inert atmosphere, a Si powder (3N, 10 μm ground product) and the silicate powder of Example 1 were weighed in a mass ratio of 42:58, and $ZrO_2$ oxide particles were added thereto such that the content thereof reached 1 mass %. The content of each element in the silicate phase was the same as in Example 1. The content of the $ZrO_2$ oxide particles dispersed in the silicate phase is 1 mass % based on the mass of the base particle as described above. A non-aqueous electrolyte secondary battery was produced in the same manner as in Example 1, except that this negative electrode active material was used.

Example 3

A negative electrode active material was produced in the same manner as in Example 1, except that, in an inert atmosphere, a Si powder (3N, 10 μm ground product) and the silicate powder of Example 1 were weighed in a mass ratio of 42:58, and $ZrO_2$ oxide particles were added thereto such that the content thereof reached 3 mass %. The content of each element in the silicate phase was the same as in Example 1. The content of the $ZrO_2$ oxide particles dispersed in the silicate phase is 3 mass % based on the mass of the base particle as described above. A non-aqueous electrolyte secondary battery was produced in the same manner as in Example 1, except that this negative electrode active material was used.

Example 4

A negative electrode active material was produced in the same manner as in Example 1, except that, in an inert atmosphere, a Si powder (3N, 10 μm ground product) and the silicate powder of Example 1 were weighed in a mass ratio of 42:58, and $ZrO_2$ oxide particles were added thereto such that the content thereof reached 15 mass %. The content of each element in the silicate phase was the same as in Example 1. The content of the $ZrO_2$ oxide particles dispersed in the silicate phase is 15 mass %, based on the mass of the base particle as described above. A non-aqueous electrolyte secondary battery was produced in the same manner as in Example 1, except that this negative electrode active material was used.

Example 5

A negative electrode active material was produced in the same manner as in Example 1, except that, in an inert atmosphere, a Si powder (3N, 10 μm ground product) and the silicate powder of Example 1 were weighed in a mass ratio of 42:58. $ZrO_2$ oxide particles were added thereto such that the content thereof reached 1 mass %, and additionally $Y_2O_3$ oxide particles were added thereto such that the content thereof reached 0.06 mass %. The content of each element in the silicate phase was the same as in Example 1. The content of the $ZrO_2$ oxide particles dispersed in the silicate phase is 1 mass % based on the mass of the base particle as described above, and the content of the $Y_2O_3$ oxide particles is 0.06 mass % based on the mass of the base particle as described above. A non-aqueous electrolyte secondary battery was produced in the same manner as in Example 1, except that this negative electrode active material was used.

Example 6

A negative electrode active material was produced in the same manner as in Example 1, except that, in an inert atmosphere, a Si powder (3N, 10 μm ground product) and the silicate powder of Example 1 were weighed in a mass ratio of 42:58, and $CeO_2$ oxide particles were added thereto such that the content thereof reached 1 mass %. The content of each element in the silicate phase was the same as in Example 1. The content of the $CeO_2$ oxide particles dispersed in the silicate phase is 1 mass % based on the mass of the base particle as described above. A non-aqueous electrolyte secondary battery was produced in the same manner as in Example 1, except that this negative electrode active material was used.

Example 7

A negative electrode active material was produced in the same manner as in Example 1, except that, in an inert atmosphere, a Si powder (3N, 10 μm ground product) and the silicate powder of Example 1 were weighed in a mass ratio of 42:58, and CaO oxide particles were added thereto such that the content thereof reached 1 mass %. The content of each element in the silicate phase was the same as in Example 1. The content of the CaO oxide particles dispersed in the silicate phase is 1 mass % based on the mass of the base particle as described above. A non-aqueous electrolyte secondary battery was produced in the same manner as in Example 1, except that this negative electrode active material was used.

Example 8

A negative electrode active material was produced in the same manner as in Example 1, except that, in an inert atmosphere, a Si powder (3N, 10 μm ground product) and the silicate powder of Example 1 were weighed in a mass ratio of 42:58, and $Al_2O_3$ oxide particles were added thereto such that the content thereof reached 1 mass %. The content of each element in the silicate phase was the same as in Example 1. The content of the $Al_2O_3$ oxide particles dispersed in the silicate phase is 1 mass % based on the mass of the base particle as described above. A non-aqueous electrolyte secondary battery was produced in the same manner as in Example 1, except that this negative electrode active material was used.

Example 9

A negative electrode active material was produced in the same manner as in Example 1, except that, in an inert atmosphere, a Si powder (3N, 10 μm ground product) and the silicate powder of Example 1 were weighed in a mass ratio of 42:58, and $Fe_2O$ oxide particles were added thereto such that the content thereof reached 1 mass %. The content of each element in the silicate phase was the same as in Example 1. The content of the $Fe_2O$ oxide particles dispersed in the silicate phase is 1 mass % based on the mass of the base particle as described above. A non-aqueous electrolyte secondary battery was produced in the same manner as in Example 1, except that this negative electrode active material was used.

Example 10

A negative electrode active material was produced in the same manner as in Example 1, except that, in an inert atmosphere, a Si powder (3N, 10 μm ground product) and the silicate powder of Example 1 were weighed in a mass ratio of 42:58, and $Fe_2O$ oxide particles were added thereto such that the content thereof reached 1 mass %. The content of each element in the silicate phase was the same as in Example 1. The content of the $Fe_2O$ oxide particles dispersed in the silicate phase is 1 mass % based on the mass of the base particle as described above. A non-aqueous electrolyte secondary battery was produced in the same manner as in Example 1, except that this negative electrode active material was used.

Example 11

A negative electrode active material was produced in the same manner as in Example 1, except that, in an inert atmosphere, a Si powder (3N, 10 μm ground product) and the silicate powder of Example 1 were weighed in a mass ratio of 42:58, and FeO oxide particles were added thereto such that the content thereof reached 1 mass %. The content of each element in the silicate phase was the same as in Example 1. The content of the FeO oxide particles dispersed in the silicate phase is 1 mass % based on the mass of the base particle as described above. A non-aqueous electrolyte secondary battery was produced in the same manner as in Example 1, except that this negative electrode active material was used.

Example 12

A negative electrode active material was produced in the same manner as in Example 1, except that, in an inert atmosphere, a Si powder (3N, 10 μm ground product) and the silicate powder of Example 1 were weighed in a mass ratio of 42:58, and MgO oxide particles were added thereto such that the content thereof reached 1 mass %. The content of each element in the silicate phase was the same as in Example 1. The content of the MgO oxide particles dispersed in the silicate phase is 1 mass % based on the mass of the base particle as described above. A non-aqueous electrolyte secondary battery was produced in the same manner as in Example 1, except that this negative electrode active material was used.

Example 13

A negative electrode active material was produced in the same manner as in Example 1, except that, in an inert atmosphere, a Si powder (3N, 10 μm ground product) and the silicate powder of Example 1 were weighed in a mass ratio of 42:58 and $TiO_2$ oxide particles were added thereto such that the content thereof reached 1 mass %. The content of each element in the silicate phase was the same as in Example 1. The content of the $TiO_2$ oxide particles dispersed in the silicate phase is 1 mass % based on the mass of the base particle as described above. A non-aqueous electrolyte secondary battery was produced in the same manner as in Example 1, except that this negative electrode active material was used.

Example 14

A negative electrode active material was produced in the same manner as in Example 1, except that, in an inert atmosphere, a Si powder (3N, 10 μm ground product) and the silicate powder of Example 1 were weighed in a mass ratio of 42:58, and $WO_3$ oxide particles were added thereto such that the content thereof reached 1 mass %. The content of each element in the silicate phase was the same as in Example 1. The content of the $WO_3$ oxide particles dispersed in the silicate phase is 1 mass % based on the mass of the base particle as described above. A non-aqueous electrolyte secondary battery was produced in the same manner as in Example 1, except that this negative electrode active material was used.

Example 15

A silicate including Li, Si, B, and Al was produced under the same conditions as in Example 1, except that lithium oxide, silicon dioxide, boron oxide, and aluminum oxide were mixed in a molar ratio of $Li_2O/SiO_2/B_2O_3/Al_2O_3=22/58/10/10$.

A negative electrode active material was produced in the same manner as in Example 1, except that, in an inert atmosphere, a Si powder (3N, 10 μm ground product) and the silicate powder described above were weighed in a mass ratio of 42:58, $ZrO_2$ oxide particles were added thereto such that the content thereof reached 1 mass %, and the grinding treatment tune was 19 hours. As a result of the measurement of the contents of elements in the silicate phase through ICP emission spectral analysts, the Li, Si, B, and Al contents were found to be 31.0 mol %, 40.8 mol %, 14.1 mol %, and 14.1 mol %, respectively. The content of the $ZrO_2$ oxide particles dispersed in the silicate phase is 1 mass % based on the mass of the base particle as described above. A non-aqueous electrolyte secondary battery was produced in the same manner as in Example 1, except that this negative electrode active material was used.

Example 16

A silicate including Li, Si, B, and Al was produced under the same conditions as in Example 1, except that lithium oxide, silicon dioxide, boron oxide, and aluminum oxide were mixed in a molar ratio of $Li_2O/SiO_2/B_2O_3/Al_2O_3=22/48/15/15$.

A negative electrode active material was produced in the same manner as in Example 15, except that the silicate powder produced was used and the grinding treatment time was 18 hours. As a result of the measurement of the contents of elements in the silicate phase through ICP emission spectral analysis, the Li, Si, B, and A contents were found to be 28.9 mol %, 31.6 mol %, 19.7 mol %, and 19.7 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 17

A silicate including Li, Si, Ca, Mg, B, and Al was produced under the same conditions as in Example 1, except that lithium oxide, silicon dioxide, calcium oxide, magnesium oxide, boron oxide, and aluminum oxide were mixed in a molar ratio of $Li_2O/SiO_2/CaO/MgO/B_2O_3/Al_2O_3=22/67/1/5/2/3$.

A negative electrode active material was produced in the same manner as in Example 15, except that the silicate powder produced was used and the grinding treatment time was 26 hours. As a result of the measurement of the contents of elements in the silicate phase through ICP emission spectral analysis, the Li, Si, Ca, Mg, B, and Al contents were 34.6 mol %, 52.8 mol %, 0.8 mol %, 3.9 mol %, 3.1 mol %, and 4.7 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 18

A silicate including Li, Si, Ca, B, Al, and Zr was produced under the same conditions as in Example 1, except that lithium oxide, silicon dioxide, calcium oxide, boron oxide, aluminum oxide, and zirconium oxide were mixed in a molar ratio of $Li_2O/SiO_2/CaO/B_2O_3/Al_2O_3/ZrO_2=22/67/1/2/3/5$.

A negative electrode active material was produced in the same manner as in Example 15, except that the silicate powder produced was used and the grinding treatment time was 20 hours. As a result of the measurement of the contents of elements in the silicate phase through ICP emission spectral analysis, the Li, Si, Ca, B, Al, and Zr contents were 34.6 mol %, 52.8 mol %, 0.8 mol %, 3.1 mol %, 4.7 mol %, and 3.9 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 19

A silicate including Li, Si, Ca, B, Al, and Nb was produced under the same conditions as in Example 1, except that lithium oxide, silicon dioxide, calcium oxide, boron oxide, aluminum oxide, and niobium oxide were mixed in a molar ratio of $Li_2O/SiO_2/CaO/B_2O_3/Al_2O_3/Nb_2O_5=22/67/1/2/3/5$.

A negative electrode active material was produced in the same manner as in Example 15, except that the silicate powder produced was used and the grinding treatment time was 21 hours. As a result of the measurement of the contents of elements in the silicate phase through ICP emission spectral analysis, the Li, Si, Ca, B, Al, and Nb contents were 33.3 mol %, 50.8 mol %, 0.8 mol %, 3.0 mol %, 4.5 mol %, and 7.6 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 20

A silicate including Li, Si, Ca, B, Al, and Ta was produced under the same conditions as in Example 1, except that lithium oxide, silicon dioxide, calcium oxide, boron oxide, aluminum oxide, and tantalum oxide were mixed in a molar ratio of $Li_2O/SiO_2/CaO/B_2O_3/Al_2O_3/Ta_2O_5=22/67/1/2/3/5$.

A negative electrode active material was produced in the same manner as in Example 15, except that the silicate powder produced was used and the grinding treatment time was 20 hours. As a result of the measurement of the contents of elements in the silicate phase through ICP emission spectral analysis, the Li, Si, Ca, B, Al, and Ta contents were 33.3 mol %, 50.8 mol %, 0.8 mol %, 3.0 mol %, 4.5 mol %, and 7.6 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 21

A silicate including Li, Si, Ca, B, Al, and La was produced under the same conditions as in Example 1, except that lithium oxide, silicon dioxide, calcium oxide, boron oxide, aluminum oxide, and lanthanum oxide were mixed in a molar ratio of $Li_2O/SiO_2/CaO/B_2O_3/Al_2O_3/La_2O_5=22/67/1/2/3/5$.

A negative electrode active material was produced in the same manner as in Example 15, except that the silicate powder produced was used and the grinding treatment time was 20 hours. As a result of the measurement of the contents of elements in the silicate phase through ICP emission spectral analysis, the Li, Si, Ca, B, Al, and La contents were 33.3 mol %, 50.8 mol %, 0.8 mol %, 3.0 mol %, 4.5 mol %, and 7.6 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 22

A silicate including Li, Si, Ca, B, Al, and V was produced under the same conditions as in Example 1, except that lithium oxide, silicon dioxide, calcium oxide, boron oxide, aluminum oxide, and vanadium oxide were mixed in a molar ratio of $Li_2O/SiO_2/CaO/Bi_2O_3/Al_2O_3/V_2O_5=22/67/1/2/3/5$.

A negative electrode active material was produced in the same manner as in Example 15, except that the silicate powder produced was used and the grinding treatment time was 19 hours. As a result of the measurement of the contents of elements in the silicate phase through ICP emission spectral analysis, the Li, Si, Ca, B, Al, and V contents were 33.3 mol %, 50.8 mol %, 0.8 mol %, 3.0 mol %, 4.5 mol %, and 7.6 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 23

A silicate including Li, Si, Ca, B, Al, and Y was produced under the same conditions as in Example 1, except that lithium oxide, silicon dioxide, calcium oxide, boron oxide, aluminum oxide, and yttrium oxide were mixed in a molar ratio of $Li_2O/SiO_2/CaO/B_2O_3/Al_2O_3/Y_2O_3=22/67/1/2/3/5$.

A negative electrode active material was produced in the same manner as in Example 15, except that the silicate powder produced was used and the grinding treatment time was 18 hours. As a result of the measurement of the contents of elements in the silicate phase through ICP emission spectral analysis, the Li, Si, Ca, B, Al, and Y contents were 33.3 mol %, 50.8 mol %, 0.8 mol %, 3.0 mol %, 4.5 mol %, and 7.6 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 24

A silicate including Li, Si, Ca, B, Al, and Ti was produced under the same conditions as in Example 1, except that lithium oxide, silicon dioxide, calcium oxide, boron oxide, aluminum oxide, and titanium oxide were mixed in a molar ratio of $Li_2O/SiO_2/CaO/B_2O_3/Al_2O_3/TiO_2 22/67/1/2/3/5$.

A negative electrode active material was produced in the same manner as in Example 11, except that the silicate powder produced was used and the grinding treatment time was 32 hours. As a result of the measurement of the contents of elements in the silicate phase through ICP emission spectral analysis, the Li, Si, Ca, B, Al, and Ti contents were 34.6 mol %, 52.8 mol %, 0.8 mol %, 3.1 mol %, 4.7 mol %, and 3.9 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 25

A silicate including Li, Si, Ca, B, Al, and P was produced under the same conditions as in Example 1, except that lithium oxide, silicon dioxide, calcium oxide, boron oxide, aluminum oxide, and phosphorus pentaoxide were mixed in a molar ratio of $Li_2O/SiO_2/CaO/B_2O_3/Al_2O_3/P_2O_5=22/67/1/2/3/5$.

A negative electrode active material was produced in the same manner as in Example 15, except that the silicate powder produced was used and the grinding treatment time was 40 hours. As a result of the measurement of the contents of elements in the silicate phase through ICP emission spectral analysis, the Li, Si, Ca, B, Al, and P contents were 33.3 mol %, 50.8 mol %, 0.8 mol %, 3.0 mol %, 4.5 mol %, and 7.6 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 26

A silicate including Li, Si, Ca, B, Al, and W was produced under the same conditions as in Example 1, except that lithium oxide, silicon dioxide, calcium oxide, boron oxide, aluminum oxide, and tungsten oxide were mixed in a molar ratio of $Li_2O/SiO_2/CaO/B_2O_3/Al_2O_3/WO_3=22/67/1/2/3/5$.

A negative electrode active material was produced in the same manner as in Example 15, except that the silicate powder produced was used and the grinding treatment time was 35 hours. As a result of the measurement of the contents of elements in the silicate phase through ICP emission spectral analysis, the Li, Si, Ca, B, Al, and W contents were 34.6 mol %, 52.8 mol %, 0.8 mol %, 3.1 mol %, 4.7 mol %, and 3.9 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 27

A silicate including Li, Si, Ca, Mg, B, Al, Zr, Ti, P, and W was produced under the same conditions as in Example 1, except that lithium oxide, silicon dioxide, calcium oxide, magnesium oxide, boron oxide, aluminum oxide, zirconium oxide, titanium oxide, phosphorus pentaoxide, and tungsten oxide were mixed in a molar ratio of $Li_2O/SiO_2/CaO/MgO/B_2O_3/Al_2O_3/ZrO_2/TiO_2/P_2O_5/WO_3=22/55/2/3/5/5/1/1/5/1$.

A negative electrode active material was produced in the same manner as in Example 15, except that the silicate powder produced was used and the grinding treatment time was 23 hours. As a result of the measurement of the contents of elements in the silicate phase through ICP emission spectral analysis, the Li Si, Ca, Mg, B, Al, Zr, Ti, P, and W contents were found to be 32.1 mol %, 10.1 mol %, 1.5 mol %, 2.2 mol %, 7.3 mol %, 7.3 mol %, 0.7 mol %, 0.7 mol %, 7.3 mol %, and 3.9 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 28

A silicate including Li, Si, B, and Al was produced under the same conditions as in Example 1, except that lithium oxide, silicon dioxide, boron oxide, and aluminum oxide were mixed in a molar ratio of $Li_2O/SiO_2/B_2O_3/Al_2O_3=15/65/10/10$.

A negative electrode active material was produced in the same manner as in Example 15, except that the silicate powder produced was used and the grinding treatment time was 17 hours. As a result of the measurement of the contents of elements in the silicate phase through ICP emission spectral analysis, the Li, Si, B, and Al contents were found to be 22.2 mol %, 48.1 mol %, 14.8 mol %, and 14.8 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 29

A silicate including Li, Si, B, and Al was produced under the same conditions as in Example 1, except that lithium oxide, silicon dioxide, boron oxide, and aluminum oxide were mixed in a molar ratio of $Li_2O/SiO_2/B_2O_3/Al_2O_3=8/72/10/10$.

A negative electrode active material was produced in the same manner as in Example 15, except that the silicate powder produced was used and the grinding treatment time was 16 hours. As a result of the measurement of the contents of elements in the silicate phase through ICP emission spectral analysis, the Li, Si, B, and Al contents were found to be 12.5 mol %, 56.3 mol %, 15.6 mol %, and 15.6 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 30

A silicate including Li, Si, B, and Al was produced under the same conditions as in Example 1, except that lithium oxide, silicon dioxide, boron oxide, and aluminum oxide were mixed in a molar ratio of $Li_2O/SiO_2/B_2O_3/Al_2O_3=3/77/10/10$.

A negative electrode active material was produced in the same manner as in Example 15, except that the silicate powder produced was used and the grinding treatment time was 15 hours. As a result of the measurement of the contents of elements in the silicate phase through ICP emission spectral analysis, the Li, Si, B, and Al contents were found to be 4.9 mol %, 62.6 mol %, 16.3 mol %, and 16.3 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 31

A silicate including Li, Si, and B was produced under the same conditions as in Example 1, except that lithium oxide, silicon dioxide, and boron oxide were mixed in a molar ratio of $Li_2O/SiO_2/B_2O_3=33/47/20$.

A negative electrode active material was produced in the same manner as in Example 15, except that the silicate powder produced was used and the grinding treatment time was 35 hours. As a result of the measurement of the contents of elements in the silicate phase through ICP emission spectral analysis, the Li, Si, and B contents were found to be 43.1 mol %, 30.7 mol %, and 26.1 mol %, respectively. The content of the $ZrO_2$ oxide particles dispersed in the silicate phase is 1 mass % based on the mass of the base particle as in Example 15. A non-aqueous electrolyte secondary battery was produced in the same manner as in Example 1, except that this negative electrode active material was used.

Example 32

A negative electrode active material was produced in the same manner as in Example 1, except that, in an inert atmosphere, a Si powder (3N, 10 μm ground product) and the silicate powder of Example 1 were weighed in a mass ratio of 42:58 and $ZrO_2$ oxide particles were added thereto such that the content thereof reached 0.01 mass %. The content of each element in the silicate phase was the same as in Example 1. The content of the $ZrO_2$ oxide particles dispersed in the silicate phase is 0.01 mass % based on the mass of the base particle as described above. A non-aqueous electrolyte secondary battery was produced in the same manner as in Example 1, except that this negative electrode active material was used.

Example 33

A negative electrode active material was produced in the same manner as in Example 1, except that, in an inert atmosphere, a Si powder (3N, 10 μm ground product) and the silicate powder of Example 1 were weighed in a mass ratio of 42:58 and $ZrO_2$ oxide particles were added thereto such that the content thereof reached 25 mass %. The content of each element in the silicate phase was the same as in Example 1. The content of the $ZrO_2$ oxide particles dispersed in the silicate phase is 25 mass % based on the mass of the base particle as described above. A non-aqueous electrolyte secondary battery was produced in the same manner as in Example 1, except that this negative electrode active material was used.

Comparative Example 1

A silicate including Li and Si was produced under the same conditions as in Example 1, except that lithium oxide and silicon dioxide were mixed in a molar ratio of $Li_2O/SiO_2=50/50$.

A negative electrode active material was produced in the same manner as in Example 1, except that, in an inert atmosphere, a Si powder (3N, 10 μm ground product) and the silicate powder described above were weighed in a mass ratio of 42:58, $ZrO_2$ oxide particles were added thereto such that the content thereof reached 1 mass %, and the grinding treatment time was 50 hours. As a result of the measurement of the contents of elements in the silicate phase through ICP emission spectral analysis, the Li and Si contents were found to be 66.7 mol % and 33.3 mol %, respectively. The content of the $ZrO_2$ oxide particles dispersed in the silicate phase is 1 mass % based on the mass of the base particle as described above. A non-aqueous electrolyte secondary battery was produced in the same manner as in Example 1, except that this negative electrode active material was used.

Comparative Example 2

A silicate including Li, Si, and Ca was produced under the same conditions as in Example 1, except that lithium oxide, silicon dioxide, and calcium oxide were mixed in a molar ratio of $Li_2O/SiO_2/CaO=33/47/20$.

A negative electrode active material was produced in the same manner as in Example 1, except that, in an inert atmosphere, a Si powder (3N, 10 μm ground product) and the silicate powder described above were weighed in a mass ratio of 42:58, $ZrO_2$ oxide particles were added thereto such that the content thereof reached 1 mass %, and the grinding treatment time was 40 hours. As a result of the measurement of the contents of elements in the silicate phase through ICP emission spectral analysis, the Li, Si, and Ca contents were found to be 49.6 mol %, 35.3 mol %, and 15.0 mol %, respectively. The content of the $ZrO_2$ oxide particles dispersed in the silicate phase is 1 mass % based on the mass of the base particle as described above. A non-aqueous electrolyte secondary battery was produced in the same manner as in Example 1, except that this negative electrode active material was used.

Charge/Discharge Cyclic Test

A charge/discharge cyclic test was earned out on each of the batteries according to Examples and Comparative Examples, in the following manner.

Charge

A constant current charging was carried out at a current of 1 It (800 mA) to a voltage of 4.2 V, and then a constant voltage charging was carried out at a constant voltage of 4.2 V to a current of 1/20 It (40 mA).

Discharge

A constant current discharging was carried out at a current of 1 It (800 mA) to a voltage of 2.75 V.

Quiescent Period

The quiescent period between the charge and discharge described above was 10 minutes.

Charge/Discharge Cycles

The cycle consisting of the charge and the discharge described above was carried out 100 times.

The characteristics of the silicate phase and the capacity retention of the battery of each of Examples and Comparative Examples calculated by the equation below are shown in Tables 1 to 4. Note that the capacity retention of Example 5 is taken as the reference (100), and the capacity retentions of the batteries of other Examples and Comparative Examples are indicated as relative values with respect to the reference. Additionally, the first charge capacity of Example 5 is taken as the reference (100), and the first charge capacities of the batteries of other Examples and Comparative Examples are indicated as relative values with respect to the reference. The results are shown in Tables 3 and 4.

capacity retention(%)=(discharge capacity at 100th cycle/discharge capacity at first cycle)×100

TABLE 1

| | CONTENT OF EACH COMPONENT IN SILICATE PHASE mol % | | | | | | | | | | | | | | |
|---|---|---|---|---|---|---|---|---|---|---|---|---|---|---|---|
| | $Li_2O$ | $SiO_2$ | CaO | MgO | $B_2O_3$ | $Al_2O_3$ | $ZrO_2$ | $Nb_2O_5$ | $Ta_2O_5$ | $La_2O_5$ | $V_2O_5$ | $Y_2O_3$ | $TiO_2$ | $P_2O_5$ | $WO_3$ |
| EXAMPLE 1 | 22 | 72 | 1 | — | 2 | 3 | — | — | — | — | — | — | — | — | — |
| EXAMPLE 2 | 22 | 72 | 1 | — | 2 | 3 | — | — | — | — | — | — | — | — | — |
| EXAMPLE 3 | 22 | 72 | 1 | — | 2 | 3 | — | — | — | — | — | — | — | — | — |
| EXAMPLE 4 | 22 | 72 | 1 | — | 2 | 3 | — | — | — | — | — | — | — | — | — |
| EXAMPLE 5 | 22 | 72 | 1 | — | 2 | 3 | — | — | — | — | — | — | — | — | — |
| EXAMPLE 6 | 22 | 72 | 1 | — | 2 | 3 | — | — | — | — | — | — | — | — | — |
| EXAMPLE 7 | 22 | 72 | 1 | — | 2 | 3 | — | — | — | — | — | — | — | — | — |
| EXAMPLE 8 | 22 | 72 | 1 | — | 2 | 3 | — | — | — | — | — | — | — | — | — |
| EXAMPLE 9 | 22 | 72 | 1 | — | 2 | 3 | — | — | — | — | — | — | — | — | — |
| EXAMPLE 10 | 22 | 72 | 1 | — | 2 | 3 | — | — | — | — | — | — | — | — | — |
| EXAMPLE 11 | 22 | 72 | 1 | — | 2 | 3 | — | — | — | — | — | — | — | — | — |
| EXAMPLE 12 | 22 | 72 | 1 | — | 2 | 3 | — | — | — | — | — | — | — | — | — |
| EXAMPLE 13 | 22 | 72 | 1 | — | 2 | 3 | — | — | — | — | — | — | — | — | — |
| EXAMPLE 14 | 22 | 72 | 1 | — | 2 | 3 | — | — | — | — | — | — | — | — | — |
| EXAMPLE 15 | 22 | 58 | — | — | 10 | 10 | — | — | — | — | — | — | — | — | — |
| EXAMPLE 16 | 22 | 48 | — | — | 15 | 15 | — | — | — | — | — | — | — | — | — |
| EXAMPLE 17 | 22 | 67 | 1 | 5 | 2 | 3 | — | — | — | — | — | — | — | — | — |
| EXAMPLE 18 | 22 | 67 | 1 | — | 2 | 3 | 5 | — | — | — | — | — | — | — | — |
| EXAMPLE 19 | 22 | 67 | 1 | — | 2 | 3 | — | 5 | — | — | — | — | — | — | — |
| EXAMPLE 20 | 22 | 67 | 1 | — | 2 | 3 | — | — | 5 | — | — | — | — | — | — |
| EXAMPLE 21 | 22 | 67 | 1 | — | 2 | 3 | — | — | — | 5 | — | — | — | — | — |
| EXAMPLE 22 | 22 | 67 | 1 | — | 2 | 3 | — | — | — | — | 5 | — | — | — | — |
| EXAMPLE 23 | 22 | 67 | 1 | — | 2 | 3 | — | — | — | — | — | 5 | — | — | — |
| EXAMPLE 24 | 22 | 67 | 1 | — | 2 | 3 | — | — | — | — | — | — | 5 | — | — |
| EXAMPLE 25 | 22 | 67 | 1 | — | 2 | 3 | — | — | — | — | — | — | — | 5 | — |
| EXAMPLE 26 | 22 | 67 | 1 | — | 2 | 3 | — | — | — | — | — | — | — | — | 5 |
| EXAMPLE 27 | 22 | 55 | 2 | 3 | 5 | 5 | 1 | — | — | — | — | — | 1 | 5 | 1 |
| EXAMPLE 28 | 15 | 65 | — | — | 10 | 10 | — | — | — | — | — | — | — | — | — |
| EXAMPLE 29 | 8 | 72 | — | — | 10 | 10 | — | — | — | — | — | — | — | — | — |
| EXAMPLE 30 | 3 | 77 | — | — | 10 | 10 | — | — | — | — | — | — | — | — | — |
| EXAMPLE 31 | 33 | 47 | — | — | 20 | — | — | — | — | — | — | — | — | — | — |

TABLE 2

| | CONTENT OF EACH COMPONENT IN SILICATE PHASE mol % | | | | | | | | | | | | | | |
|---|---|---|---|---|---|---|---|---|---|---|---|---|---|---|---|
| | $Li_2O$ | $SiO_2$ | CaO | MgO | $B_2O_3$ | $Al_2O_3$ | $ZrO_2$ | $Nb_2O_5$ | $Ta_2O_5$ | $La_2O_5$ | $V_2O_5$ | $Y_2O_3$ | $TiO_2$ | $P_2O_5$ | $WO_3$ |
| EXAMPLE 32 | 22 | 72 | 1 | — | 2 | 3 | — | — | — | — | — | — | — | — | — |
| EXAMPLE 33 | 22 | 72 | 1 | — | 2 | 3 | — | — | — | — | — | — | — | — | — |
| COMPARATIVE EXAMPLE 1 | 50 | 50 | — | — | — | — | — | — | — | — | — | — | — | — | — |
| COMPARATIVE EXAMPLE 2 | 33 | 47 | 20 | — | — | — | — | — | — | — | — | — | — | — | — |

TABLE 3

| | CONTENT OF EACH COMPONENT IN SILICATE PHASE mol % | | | | | | | | | | | | | | | OXIDE SPECIES | OXIDE PARTICLES AMOUNT ADDED (wt %) | CAPACITY RETENTION | FIRST CHARGE CAPACITY |
|---|---|---|---|---|---|---|---|---|---|---|---|---|---|---|---|---|---|---|---|
| | Li | Si | Ca | Mg | B | Al | Zr | Nb | Ta | La | V | Y | Ti | P | W | | | | |
| EXAMPLE 1 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $ZrO_2$ | 0.1 | 97 | 100 |
| EXAMPLE 2 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $ZrO_2$ | 1 | 99 | 100 |
| EXAMPLE 3 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $ZrO_2$ | 3 | 99 | 100 |
| EXAMPLE 4 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $ZrO_2$ | 15 | 98 | 95 |
| EXAMPLE 5 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $ZrO_2$ $Y_2O_3$ | 1 0.06 | 100 | 100 |
| EXAMPLE 6 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $CeO_2$ | 1 | 98 | 100 |
| EXAMPLE 7 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | CaO | 1 | 97 | 100 |
| EXAMPLE 8 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $Al_2O_3$ | 1 | 97 | 100 |
| EXAMPLE 9 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $Fe_2O_3$ | 1 | 96 | 100 |
| EXAMPLE 10 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | $Fe_2O$ | 1 | 95 | 100 |
| EXAMPLE 11 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | FeO | 1 | 95 | 100 |
| EXAMPLE 12 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | MgO | 1 | 93 | 100 |

TABLE 3-continued

| | CONTENT OF EACH COMPONENT IN SILICATE PHASE mol % | | | | | | | | | | | | | | | OXIDE SPECIES | OXIDE PARTICLES AMOUNT ADDED (wt %) | CAPAC-ITY RETEN-TION | FIRST CHARGE CAPAC-ITY |
|---|---|---|---|---|---|---|---|---|---|---|---|---|---|---|---|---|---|---|---|
| | Li | Si | Ca | Mg | B | Al | Zr | Nb | Ta | La | V | Y | Ti | P | W | | | | |
| EXAMPLE 13 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | TiO$_2$ | 1 | 92 | 100 |
| EXAMPLE 14 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | WO$_3$ | 1 | 91 | 100 |
| EXAMPLE 15 | 31.0 | 40.8 | 0.0 | 0.0 | 14.1 | 14.1 | 0.0 | 0.0 | 0.0 | 0.0 | 0.0 | 0.0 | 0.0 | 0.0 | 0.0 | ZrO$_2$ | 1 | 98 | 100 |
| EXAMPLE 16 | 28.9 | 31.6 | 0.0 | 0.0 | 19.7 | 19.7 | 0.0 | 0.0 | 0.0 | 0.0 | 0.0 | 0.0 | 0.0 | 0.0 | 0.0 | ZrO$_2$ | 1 | 98 | 100 |
| EXAMPLE 17 | 34.6 | 52.8 | 0.8 | 3.9 | 3.1 | 4.7 | 0.0 | 0.0 | 0.0 | 0.0 | 0.0 | 0.0 | 0.0 | 0.0 | 0.0 | ZrO$_2$ | 1 | 97 | 100 |
| EXAMPLE 18 | 34.6 | 52.8 | 0.8 | 0.0 | 3.1 | 4.7 | 3.9 | 0.0 | 0.0 | 0.0 | 0.0 | 0.0 | 0.0 | 0.0 | 0.0 | ZrO$_2$ | 1 | 100 | 100 |
| EXAMPLE 19 | 33.3 | 50.8 | 0.8 | 0.0 | 3.0 | 4.5 | 0.0 | 7.6 | 0.0 | 0.0 | 0.0 | 0.0 | 0.0 | 0.0 | 0.0 | ZrO$_2$ | 1 | 100 | 100 |
| EXAMPLE 20 | 33.3 | 50.8 | 0.8 | 0.0 | 3.0 | 4.5 | 0.0 | 0.0 | 7.6 | 0.0 | 0.0 | 0.0 | 0.0 | 0.0 | 0.0 | ZrO$_2$ | 1 | 100 | 100 |
| EXAMPLE 21 | 33.3 | 50.8 | 0.8 | 0.0 | 3.0 | 4.5 | 0.0 | 0.0 | 0.0 | 7.6 | 0.0 | 0.0 | 0.0 | 0.0 | 0.0 | ZrO$_2$ | 1 | 100 | 100 |
| EXAMPLE 22 | 33.3 | 50.8 | 0.8 | 0.0 | 3.0 | 4.5 | 0.0 | 0.0. | 0.0 | 0.0 | 7.6 | 0.0 | 0.0 | 0.0 | 0.0 | ZrO$_2$ | 1 | 95 | 100 |
| EXAMPLE 23 | 33.3 | 50.8 | 0.8 | 0.0 | 3.0 | 4.5 | 0.0 | 0.0 | 0.0 | 0.0 | 0.0 | 7.6 | 0.0 | 0.0 | 0.0 | ZrO$_2$ | 1 | 100 | 100 |
| EXAMPLE 24 | 34.6 | 52.8 | 0.8 | 0.0 | 3.1 | 4.7 | 0.0 | 0.0 | 0.0 | 0.0 | 0.0 | 0.0 | 3.9 | 0.0 | 0.0 | ZrO$_2$ | 1 | 98 | 100 |
| EXAMPLE 25 | 33.3 | 50.8 | 0.8 | 0.0 | 3.0 | 4.5 | 0.0 | 0.0 | 0.0 | 0.0 | 0.0 | 0.0 | 0.0 | 7.6 | 0.0 | ZrO$_2$ | 1 | 99 | 100 |
| EXAMPLE 26 | 34.6 | 52.8 | 0.8 | 0.0 | 3.1 | 4.7 | 0.0 | 0.0 | 0.0 | 0.0 | 0.0 | 0.0 | 0.0 | 0.0 | 3.9 | ZrO$_2$ | 1 | 99 | 100 |
| EXAMPLE 27 | 32.1 | 40.1 | 1.5 | 2.2 | 7.3 | 7.3 | 0.7 | 0.0 | 0.0 | 0.0 | 0.0 | 0.0 | 0.7 | 7.3 | 0.7 | ZrO$_2$ | 1 | 97 | 100 |
| EXAMPLE 28 | 22.2 | 48.1 | 0.0 | 0.0 | 14.8 | 14.8 | 0.0 | 0.0 | 0.0 | 0.0 | 0.0 | 0.0 | 0.0 | 0.0 | 0.0 | ZrO$_2$ | 1 | 94 | 100 |
| EXAMPLE 29 | 12.5 | 56.3 | 0.0 | 0.0 | 15.6 | 15.6 | 0.0 | 0.0 | 0.0 | 0.0 | 0.0 | 0.0 | 0.0 | 0.0 | 0.0 | ZrO$_2$ | 1 | 92 | 100 |
| EXAMPLE 30 | 4.9 | 62.6 | 0.0 | 0.0 | 16.3 | 16.3 | 0.0 | 0.0 | 0.0 | 0.0 | 0.0 | 0.0 | 0.0 | 0.0 | 0.0 | ZrO$_2$ | 1 | 90 | 100 |
| EXAMPLE 31 | 43.1 | 30.7 | 0.0 | 0.0 | 26.1 | 0.0 | 0.0 | 0.0 | 0.0 | 0.0 | 0.0 | 0.0 | 0.0 | 0.0 | 0.0 | ZrO$_2$ | 1 | 93 | 100 |

TABLE 4

| | CONTENT OF EACH COMPONENT IN SILICATE PHASE mol % | | | | | | | | | | | | | | | OXIDE SPECIES | OXIDE PARTICLES AMOUNT ADDED (wt %) | CAPAC-ITY RETEN-TION | FIRST CHARGE CAPAC-ITY |
|---|---|---|---|---|---|---|---|---|---|---|---|---|---|---|---|---|---|---|---|
| | Li | Si | Ca | Mg | B | Al | Zr | Nb | Ta | La | V | Y | Ti | P | W | | | | |
| EXAMPLE 32 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | ZrO$_2$ | 0.01 | 90 | 100 |
| EXAMPLE 33 | 34.6 | 56.7 | 0.8 | 0.0 | 3.1 | 4.7 | 0.0 | 0.0 | 0.0 | 0.0 | 0.0 | 0.0 | 0.0 | 0.0 | 0.0 | ZrO$_2$ | 25 | 95 | 80 |
| COMPARATIVE EXAMPLE 1 | 66.7 | 33.3 | 0.0 | 0.0 | 0.0 | 0.0 | 0.0 | 0.0 | 0.0 | 0.0 | 0.0 | 0.0 | 0.0 | 0.0 | 0.0 | ZrO$_2$ | 1 | 82 | 100 |
| COMPARATIVE EXAMPLE 2 | 49.6 | 35.3 | 15.0 | 0.0 | 0.0 | 0.0 | 0.0 | 0.0 | 0.0 | 0.0 | 0.0 | 0.0 | 0.0 | 0.0 | 0.0 | ZrO$_2$ | 1 | 75 | 100 |

As shown in Tables 3 and 4, the batteries of Examples 1 to 33 resulted in a higher capacity retention and timber prevention of the deterioration in the charge/discharge cyclic characteristics than those of Comparative Examples 1 and 2. Particularly, the batteries of Examples 1 to 31 and 33, in which the content of the oxide particles dispersed in the silicate phase is 0.1 mass % or more based on the mass of the base particle, resulted in a higher capacity retention and further prevention of the deterioration in the charge/discharge cyclic characteristics than those of Example 32.

REFERENCE SIGNS LIST 10 negative electrode active material particle
11 lithium silicate phase
12 silicon particles
13 base particle
14 conductive layer
15 oxide particles

The invention claimed is:

1. A negative electrode active material for a secondary battery comprising:
a silicate phase including Li, Si, and $M^x$, wherein $M^x$ is an element other than an alkali metal, an alkaline earth metal, or Si,
wherein $M^x$ includes at least one element selected from the group consisting of Zr, Ge, B, Bi, Y, La, Sb, Nb, Ta, P, V, and W;
silicon particles dispersed in the silicate phase; and
oxide particles including at least any one of oxide particles including Zr, oxide particles including Ce, oxide particles including Ca, oxide particles including Al, oxide particles including Fe, oxide particles including Mg, oxide particles including Ti, and oxide particles including W, dispersed in the silicate phase, wherein,
in the silicate phase, a Li content is 3 to 45 mol %, a Si content is 40 to 78 mol %, and an $M^x$ content is 1 to 40 mol %, each based on the total amount of elements other than oxygen.

2. The negative electrode active material for a secondary battery according to claim 1, wherein
the oxide particles include the oxide particles including Zr.

3. The negative electrode active material for a secondary battery according to claim 2, wherein
the oxide particles including Zr include a Y element.

4. The negative electrode active material for a secondary battery according to claim 2, further including oxide particles including a Y element.

5. The negative electrode active material for a secondary battery according to claim 1, wherein the oxide particles include at least any one of $ZrO_2$, $CeO_2$, CaO, $Al_2O_3$, $Fe_2O_3$, $Fe_2O_4$, FeO, MgO, $TiO_2$, and $WO_3$.

6. The negative electrode active material for a secondary battery according to claim 1, wherein
a content of the oxide particles is 0.02 mass % to 20 mass % based on the total mass of the silicate phase, the silicon particles, and the oxide particles.

7. The negative electrode active material for a secondary battery according to claim 1, wherein
an average particle size of the oxide particles is 10 μm or less.

8. A secondary battery comprising:
a negative electrode including the negative electrode active material for a secondary battery according to claim 1;
a positive electrode; and
an electrolyte.

9. The negative electrode active material for a secondary battery according to claim 5, wherein
the oxide particles include $ZrO_2$.

10. The negative electrode active material for a secondary battery according to claim 1, wherein
$M^x$ further includes at least one of Al or Ti.

* * * * *